United States Patent [19]

Parkinson et al.

[11] 4,192,049

[45] Mar. 11, 1980

[54] METHOD OF MANUFACTURING BATTERY PLATES

[75] Inventors: David B. Parkinson, Cleveland Heights; Truman D. Parkinson, Chardon, both of Ohio

[73] Assignee: Gould Inc., Rolling Meadows, Ill.

[21] Appl. No.: 920,620

[22] Filed: Jun. 29, 1978

Related U.S. Application Data

[62] Division of Ser. No. 840,372, Oct. 7, 1977, Pat. No. 4,121,023.

[51] Int. Cl.$^2$ ............................................. H01M 10/04
[52] U.S. Cl. ........................................... 29/2; 29/623.5
[58] Field of Search ........................ 29/623.5, 623.1, 2; 429/211, 234, 241, 245, 233, 269

[56] References Cited

U.S. PATENT DOCUMENTS

| | | | |
|---|---|---|---|
| 353,511 | 11/1886 | Sorley | 429/234 |
| 562,396 | 6/1896 | Gülcher | 429/245 |
| 3,690,950 | 9/1972 | Wheadon et al. | 429/234 |
| 3,808,054 | 4/1974 | Wheadon et al. | 429/211 |
| 3,956,012 | 5/1976 | Scholle | 429/211 |

FOREIGN PATENT DOCUMENTS 2558815 6/1977 Fed. Rep. of Germany ........... 429/211

Primary Examiner—Daniel C. Crane
Attorney, Agent, or Firm—Russell E. Baumann; Edward E. Sachs

[57] ABSTRACT

An improved battery plate comprises a grid or web of woven non-conductive material having lead metal or other electrically conductive material wires as some of the weft and possibly some of the warp threads. By alternately applying positive and negative active materials at laterally spaced locations across a wide web of such material and gathering portions of lead wires to form terminals, plate pairs are produced which are joined by a length of woven material of suitable strength for supporting the plates in a battery. Thus, pure lead metal wires may be used for improved electro-chemical properties, while simultaneously a great reduction in plate weight is achieved. A method of making such plates is also disclosed.

5 Claims, 12 Drawing Figures

METHOD OF MANUFACTURING BATTERY PLATES

This is a division of application Ser. No. 840,372, filed Oct. 7, 1977, now U.S. Pat. No. 4,121,023 granted Oct. 17, 1978.

BACKGROUND OF THE INVENTION

Over the years, secondary batteries have been improved in many ways to provide increased life, greater vibration resistance, virtually maintenance free operation and other notable advantages. Nonetheless, one particular characteristic of such batteries has so far defied great improvement: sheer weight. Typically, prior art battery plates have comprised a grid of lead alloy which supports a positive or a negative active material or paste. The active materials interact with the battery electrolyte to produce electrical current which is carried from the plate to some sort of terminal via the lead alloy grid. From an electrochemical point of view, it would be desirable to make the grid from pure lead metal; however, pure lead has very poor mechanical properties so that it usually has been alloyed with antimony or calcium, for example, to provide adequate strength. As is known in the art, these alloying materials interfere with the electrochemical reactions in the battery and can effect battery life considerably.

Attempts have been made in the past to reduce the amount of lead in a battery as a weight-saving measure. For example, Gulcher's U.S. Pat. No. 562,396 suggests the use of a woven grid of vertical lead metal wires and horizontal glass or quartz threads. However, since the plate is supported by the lead wires at its upper end, rather thick, heavy wires of pure lead or thinner wires of special alloys would have to be used to provide adequate strength to support the plate. In either event, the plate would be rather heavy. A more recent, somewhat similar approach is taught by Ikari et al in U.S. Pat. No. 3,944,431; however, the plate is still supported by its lead metal components, thus requiring the use of a considerable amount of lead for adequate strength. So, while the prior art does suggest ways of reducing the amount of lead in a battery plate, reliance on the use of the lead components for plate support has continued to necessitate the use of large amounts of lead.

Another recent approach to the problem of reducing the amount of lead is disclosed by Parkinson and Konishi in U.S. Ser. No. 731,137, filed Oct. 12, 1976, now U.S. Pat. No. 4,134,192, and assigned to Gould Inc., the assignee of the present application. The disclosure of U.S. Pat. No. 4,134,192 is hereby incorporated by reference in this application. As taught in U.S. Pat. No. 4,134,192, lead threads are woven or inserted into a web of material such as fiberglass. The web is then pasted with the required active material. The individual, separate plates produced in this manner are supported by appropriate attachments to a length of the material web which extends beyond the pasted area, rather than to the lead threads, so that very little mechanical stress is borne by the lead threads. The amount of lead in such plates may be reduced vastly, by as much as fifty percent (50%) in some examples; moreover, virtually pure lead can be used for the lead threads since alloying for strength is no longer necessary. Moreover, conductive materials such at tantalum, carbon fiber threads and others familiar to those in the art may be used in place of lead threads where suitable active materials are chosen. The plates disclosed in this application have many advantages; however, supporting the plates in a battery has presented some problems. The present invention concerns improved plates of the type disclosed in U.S. Pat. No. 4,134,192, which embody unique provisions for facilitating their installation and support in a battery housing, and also methods of making such plates.

OBJECT OF THE INVENTION

An object of the invention is to provide improved light-weight battery plates having a length of unpasted cloth grid structure which is used to support two or more adjacent battery plates within the battery case.

A further object of the invention is to provide such plates in groups of several plates of alternating positive and negative characteristics, adjacent plates being alternately interconnected at their upper and lower edges by unpasted lengths of cloth grid, whereby the group of plates may be accordion folded on their interconnecting lengths of cloth grid to form a plate bundle for a battery cell.

Yet another object of the invention is to provide an improved separator for use with the positive ones of such plates, the separator being so configured that its upper edges support adjacent plates of a pair in a battery cell.

A still further object of the invention is to provide an economical method of making such cloth supported battery plates in which a web of material including threads of conductive metal is essentially continuously pasted to form a plurality of adjacent plates.

These objects of the invention are given only by way of example; thus, other desirable objects and advantages inherently achieved by the disclosed invention may occur to those skilled in the art. Nonetheless, the scope of the invention is to be limited only by the appended claims.

SUMMARY OF THE INVENTION

The above objects and other desirable advantages are achieved in accordance with the method and apparatus of the present invention. According to the method of the invention, a web of electrically insulating material such as fiberglass is woven which includes a plurality of spaced lead threads as at least a portion of its discrete weft or warp elements or both, these lead thread elements extending at least part way across or along the web. As used in this specification, "lead threads" is intended to include pure lead metal threads or filaments and also threads or filaments of any lead alloy. Those skilled in the art will appreciate, however, that other electrically conductive materials such as silver, tantalum, carbon fiber and the like could replace lead threads in many applications without departing from the scope of this invention. The web is made with sufficient width to accommodate a plurality of battery plates at laterally spaced locations thereon, following conventional weaving techniques disclosed in U.S. Pat. No. 4,134,192. At a convenient point during web preparation, the conductive material threads are gathered together and then fused or otherwise joined to form terminals for the individual plates, the terminals extending between the laterally spaced locations. Then each spaced location is pasted with a positive or negative material so that the material penetrates the web and intimately contacts spaced portions of the conductive material threads. Usually, alternating positive and negative plates are formed across the width of the web. After the spaced locations have been pasted, the web is cut as necessary to separate the plates from it in pairs or larger groups. In some embodiments, spaced conductive material threads may also be included as discrete warp elements extending at least part way along the length of the web, in addition to, or in place of, the laterally extending weft elements previously mentioned. Where only warp elements of conductive material are used, gathering the threads to form terminals may be accomplished as taught in U.S. Pat. No. 4,134,192 or in any other convenient manner. In other embodiments of the method, alternating positive and negative plates are formed across the width of the web and, following separation of a row of such elements from such web, the alternating plates are folded accordion style to form a plate bundle for use as a battery cell.

The battery plate structure according to the invention comprises a web of textile material which has spaced conductive material threads included as at least a portion of the discrete warp or weft elements, or both, of the web with these conductive material threads extending at least part way across the web and gathered to form terminals at spaced locations across the web. An active material is applied to the web which penetrates the web is intimately contact the conductive material threads. Means are provided which cooperate with the web material to support the web, the conductive material threads and the active material without significantly mechanically stressing the conductive material threads.

DETAILED DESCRIPTION OF THE PREFERRED EMBODIMENTS

Figure 1:
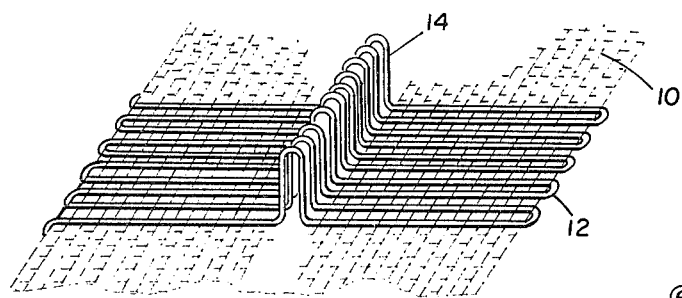
FIG. 1 shows a perspective view of a length of woven battery grid having conductive material weft threads looped outside the grid at the center for forming a pair of laterally spaced grids joined by a length of cloth.

A detailed description of the invention is presented below, reference being made to the drawings in which like reference numerals identify like elements of structure in each of the several Figures.

FIG. 1 shows a perspective view of a web 10 of textile material such as fiberglass cloth, which includes a plurality of electrically conductive wire weft threads 12 extending across the width of the material, as illustrated. Threads 12 may be of lead metal, lead alloy, silver, tantalum and so forth, as mentioned previously. The web 10 and threads 12 may be woven using conventional weaving techniques of the type taught in U.S. Pat. No. 4,134,192 or in any other suitable manner without departing from the scope of the present invention. In the embodiment illustrated in FIG. 1, the web 10 is of sufficient width to accommodate two laterally spaced battery plates; therefore, central or intermediate loops 14 are provided in conductive material threads 12. These loops extend above web 10, and are provided in accordance with techniques well known to those skilled in the weaving arts. As will subsequently be discussed, loops 14 are used to form the battery plate grid illustrated in FIG. 1 in which partial width conductive material wire weft threads 16 are provided which may be woven into web 10 or inserted following weaving of web 10, as preferred. The ends 18 of the partial width weft threads are drawn above web 10 at a central or intermediate location as indicated. A similar configuration is achieved for the embodiment of FIG. 1 by simply cutting loops 14.

Figure 1A:
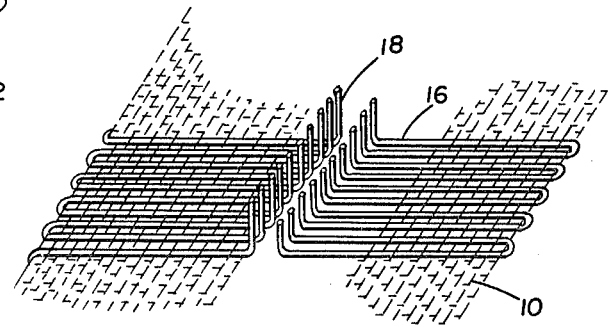
FIG. 1a shows a perspective view of a length of woven battery grid having conductive material weft threads with free ends pulled out above the grid at the center for forming a pair of laterally spaced grids joined by a length of cloth.
Figure 2:
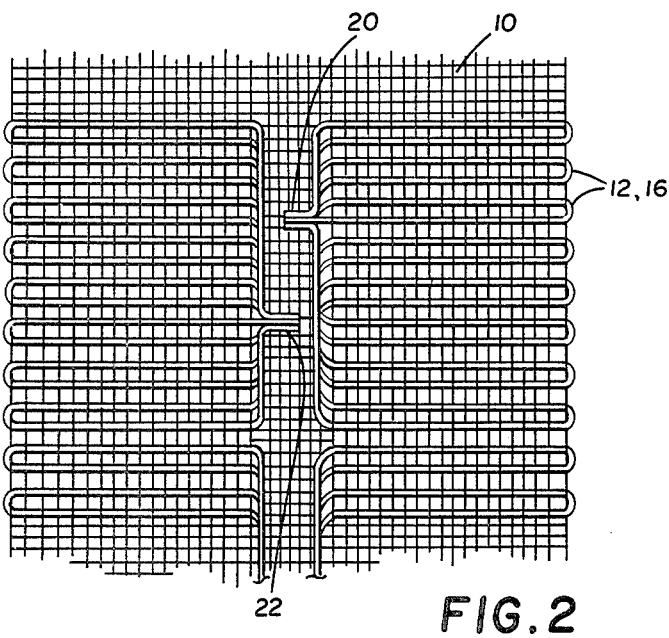
FIG. 2 shows a plan view of a length of woven battery grid in which conductive material threads from either side have been gathered to form terminals for a pair of adjacent grids joined by a length of cloth.

FIG. 2 shows a view looking down on a pair of woven battery plate grids. A fragmentary view of the following grid on web 10 is also shown. The intermediate loops 14 have been cut and gathered to form a right grid terminal 20 and a left grid terminal 22. These terminals also may be formed by gathering intermediate ends 18 if a grid of the type illustrated in FIG. 1a is used. Of course, if all warp elements are used for the conductive material threads, these elements would be gathered toward the area between woven grids prior to terminal formation (not shown). After terminals 20 and 22 have been formed, active material is applied to the grid to form a right, positive plate 24 and a left, negative plate 26. See FIG. 3. The active materials typically are applied in the form of a paste which may be applied to web 10 and threads 12, 16 by spreading a continuous strip of the paste onto each side of the web and working the paste through the web into intimate contact with threads 12, 16, as will be understood by those skilled in the art. Pasting may be accomplished manually or by automated means, as preferred.

Figure 3:
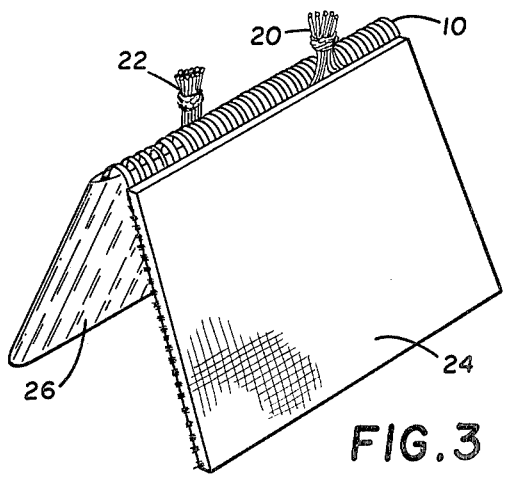
FIG. 3 shows the grid pair of FIG. 2 after application of active material to the grids, the resultant plate pair having been folded to extend its terminals upwardly.

FIG. 3 illustrates a plate pair following the application of the active material and separation from continuous web 10. A remaining portion of web 10 extends between plates 24 and 26 to provide a convenient means for supporting the plates in a battery case. When the plates are moved into the orientation shown in FIG. 3, terminals 20 and 22 extend above the plates at locations convenient for attachment to terminal bars within the completed battery, using techniques familiar to those in the art.

Figure 4:
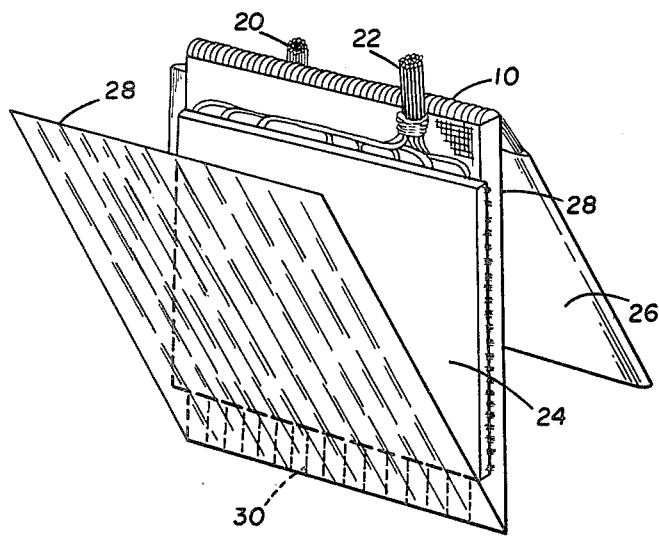
FIG. 4 shows the plate pair of FIG. 3 partially assembled with a separator envelope which surrounds one of the plates and also acts as a support for the plate pair when installed in a battery case.
Figure 4A:
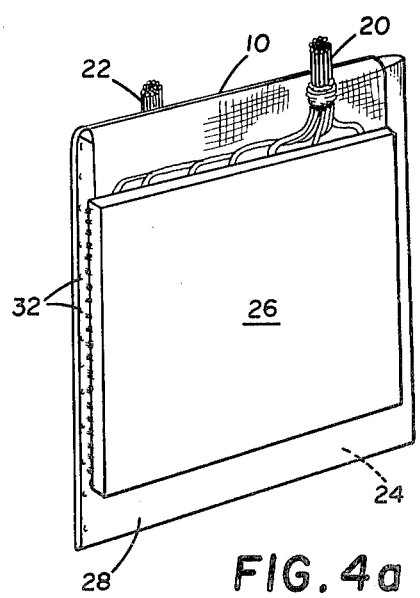
FIG. 4a shows the plate pair of FIG. 4, following assembly with the separator, the plate pair having been folded together.

FIG. 4 shows the plate pair of FIG. 3 combined with a separator 28 of porous plastic or other suitable material which may be folded around the positive plate 24 in the usual manner. Separator 28 preferably comprises a plurality or ribs 30 on its inner surfaces which serve to stiffen and space it from positive plate 24, thereby providing room for movement of electrolyte and evolved gas during operation of the battery. After the separator has been folded around positive plate 24 as shown in FIG. 4, it may be tack welded or otherwise heat sealed or fused along its vertical edges as illustrated in FIG. 4a. To facilitate such joining of its edges, separator 28 is preferably made from a thermal plastic material; however, other separator materials such as stiff ribbed paper may be used without departing from the scope of the present invention. In place of a folded envelope of separator material, a simple card of stiff material may be placed on either side of the positive plate. Whether a folded separator or a simple card is used, the vertical height of the separator should exceed that of the pasted area of the plate somewhat. Then when the plate pair is folded as shown in FIG. 4a, the two plates are supported on the separator via the portion of web 10 extending between the plates.

Figure 5:
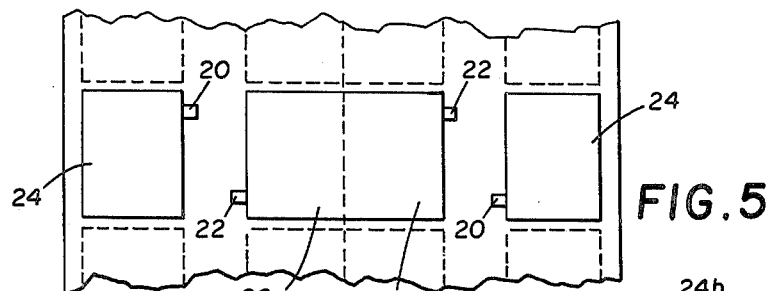
FIGS. 5 and 5a show lateral sections of longitudinally continuous webs of cloth grid on which alternating areas of positive and negative paste have been applied, so that by cutting some of the pasted areas before or after curing, interconnected plate pairs are formed.
Figure 5A:
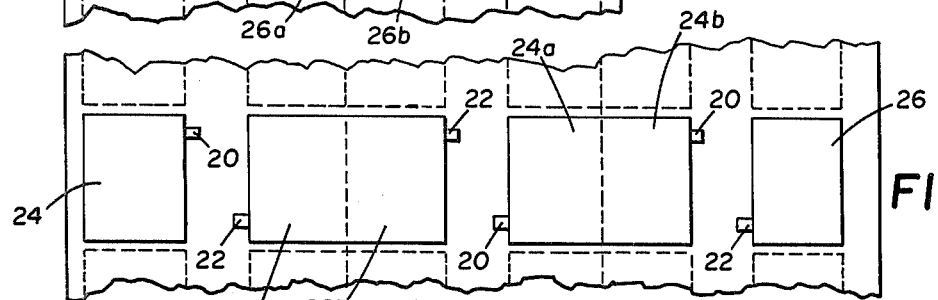

FIGS. 5 and 5a illustrate schematically the steps of a battery plate manufacturing process in which a plurality of plate pairs may be made on a single web of material. Web 10 may be of any desired length and of sufficient width to accommodate a plurality of positive plates 24, 24a, 24b and negative plates 26, 26a, 26b. Only a lateral extending segment of web 10 is illustrated, it being understood that successive lateral rows of plates are produced. As illustrated, alternate ones of the positive and negative plates are made of double width so that in subsequent processing, the double width plate sections may be severed along the illustrated vertical dashed lines to form separate plate pairs.

Figure 6:
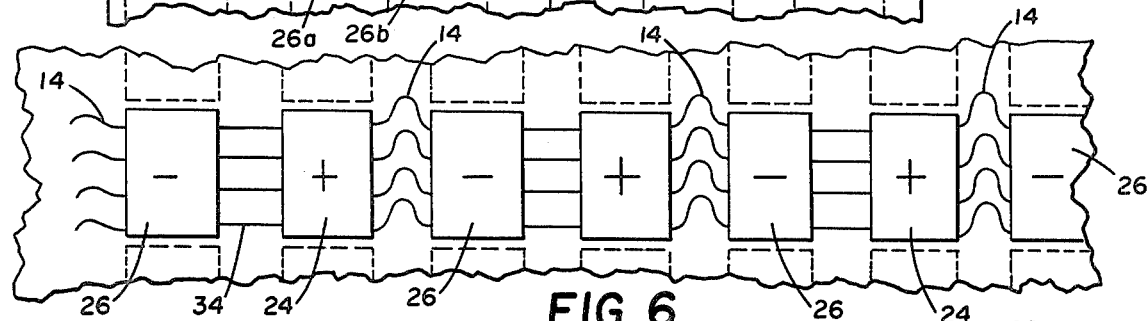
FIGS 6 and 6a showed lateral sections of longitudinally continuous webs of cloth grid on which alternating, single plate sized areas of positive and negative paste have been applied, so that by accordion folding the section before or after curing of the plates, a complete plate bundle is provided for a battery cell.
Figure 6A:
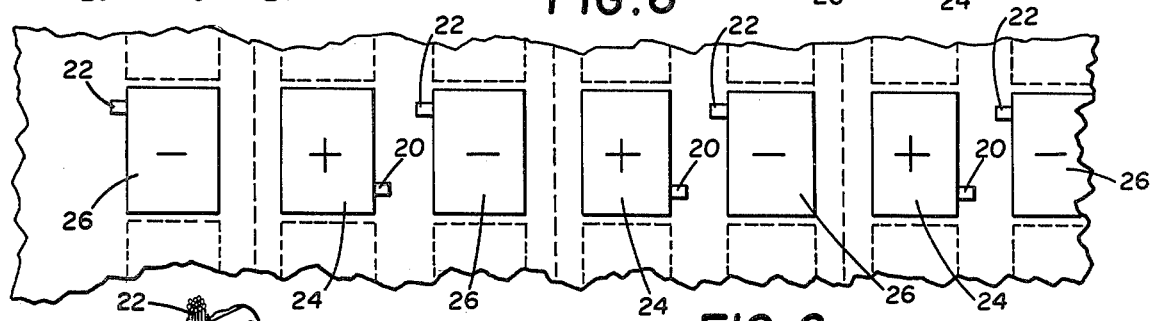
Figure 6B:
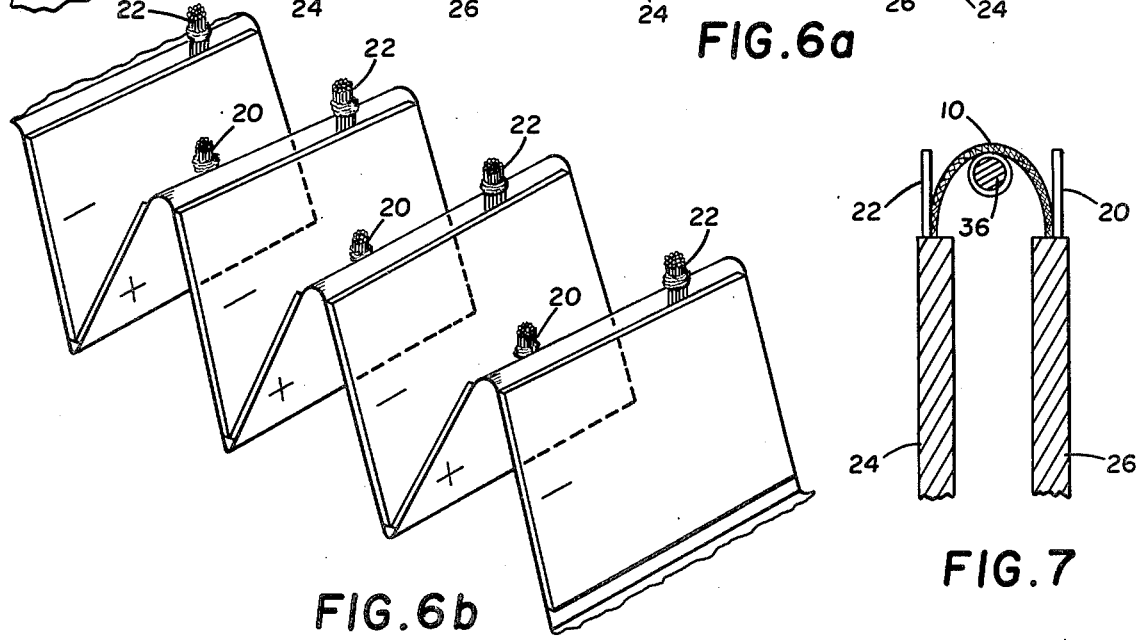
FIG. 6b shows such an accordion folded plate bundle.

Another approach to forming a plurality of plates on a single web of material is illustrated in FIGS. 6, 6a and 6b. In this situation, web 10 is provided with a width adequate to accommodate a large number of laterally spaced locations of sufficient size for applying a number of battery plates to the web. Between these laterally spaced locations, conductive material weft threads 12 are brought above web 10 during weaving to form loops 14 which facilitate gathering threads 12 subsequently to form terminals 20 and 22, as illustrated in FIGS. 6 and 6a. The portions of threads 12 extending between spaced locations where terminals are not required are also brought above web 10 but without loops. These portions are simply severed and the material recycled for subsequent use. Once terminals 20, 22 have been formed, the positive and negative active materials are applied to alternating ones of the spaced locations to form a band of positive and negative plate areas extending across the width of web 10, as shown in FIG. 6a. The web is then cut across its width. At this point, adjacent plate pairs may be severed from the web by separating them along the vertical dashed lines illustrated. Alternatively, web 10 may be cut across its width and then folded accordion style as shown in FIG. 6b to form a bundle of alternating positive and negative plates suitable for use as a battery cell element. Of course, suitable separators would be included in such an embodiment, in a manner similar to that shown in FIGS. 4 and 4a or by use of interleaved separator cards, as previously discussed.

Figure 7:
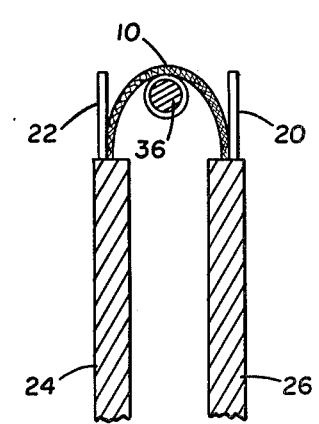
FIG. 7 shows one way of supporting interconnected plates in a battery so that the weight of the plates is borne by their interconnecting web.

FIG. 7 shows another means by which a plate pair according to the invention may be supported in a battery during operation. The battery case is provided with a rigid support rod or similar element 36, which extends across the mouth of the battery housing at assembly. A plate pair such as that shown in FIG. 4a is dropped over an element 36 so that web 10 supports plates 24 and 26 with terminals 20 and 22 extending upwardly in the battery in position for attachment to other terminal structure. The combination may then be inserted in the battery case. Thus, the battery plates are supported by the textile web 10 rather than by the conductive material threads 12. By this means, the amount of conductive material required for a given battery plate is substantially reduced so that the overall weight of the battery is minimized without adversely affecting the electrochemical performance of the battery.

Having described our invention in sufficient detail to enable those skilled in the art to make and use it, we claim:

1. A method of manufacturing battery plates comprising the steps of:
   weaving a web of material with discrete weft elements and with discrete warp elements, having spaced conductive material wires included as at least a portion of the discrete weft elements extending at least part way across the web, said web having a sufficient length and width to accommodate a plurality of plates at longitudinally and laterally spaced locations thereon;
   providing intermediate loops in said wires between said laterally spaced locations;
   severing said intermediate loops;
   gathering said severed wires where they extend between said spaced locations, to form terminals for said plates;
   applying active material to said web at said spaced locations so that said material penetrates said web and intimately contacts spaced portions of said wires whereby forming a plurality of spaced plates on said web; and
   cutting said web as necessary to separate said plates therefrom.

2. The method of claim 1, further comprising the step of weaving said web with spaced conductive material wires included as at least a portion of the discrete warp elements extending at least part way along the web.

3. The method of claim 1, wherein active material for positive plates and active material for negative plates are applied to alternate ones of said laterally spaced locations.

4. The method of claim 3, wherein said cutting step comprises cutting said web into laterally extending strips, further comprising the step of folding each of said strips accordion-style to form a battery cell of alternate positive and negative plates.

5. The method of claim 3, further comprising the step of inserting a separator element on at least one side of said positive plates.

* * * * *